US006678698B2

(12) United States Patent
Fredell et al.

(10) Patent No.: US 6,678,698 B2
(45) Date of Patent: Jan. 13, 2004

(54) COMPUTERIZED METHOD AND SYSTEM FOR COMMUNICATING AND MANAGING INFORMATION USED IN TASK-ORIENTED PROJECTS

(75) Inventors: Thomas Fredell, Hudson, MA (US); Brian Barker, Andover, MA (US)

(73) Assignee: Intralinks, Inc., New York, NY (US)

( * ) Notice: Subject to any disclaimer, the term of this patent is extended or adjusted under 35 U.S.C. 154(b) by 225 days.

(21) Appl. No.: 09/783,507

(22) Filed: Feb. 14, 2001

(65) Prior Publication Data

US 2001/0028364 A1 Oct. 11, 2001

Related U.S. Application Data

(60) Provisional application No. 60/182,796, filed on Feb. 15, 2000.

(51) Int. Cl.[7] .................................................. G06F 7/00
(52) U.S. Cl. ..................................... 707/104.1; 707/10
(58) Field of Search .......................... 707/3, 9, 10, 102, 707/100, 1, 104.1; 709/224, 225, 200, 201, 207; 345/751

(56) References Cited

U.S. PATENT DOCUMENTS

| | | | |
|---|---|---|---|
| 5,694,596 A | | 12/1997 | Campbell |
| 5,937,405 A | | 8/1999 | Campbell |
| 6,223,177 B1 | * | 4/2001 | Tatham et al. ................. 707/9 |
| 6,370,575 B1 | * | 4/2002 | Dougherty et al. ......... 709/224 |
| 6,421,678 B2 | * | 7/2002 | Smiga et al. ............... 707/102 |
| 6,453,348 B1 | * | 9/2002 | Barnier et al. .............. 709/225 |
| 2002/0184191 A1 | * | 12/2002 | Marpe et al. .................. 707/3 |

OTHER PUBLICATIONS

Backer, Andreas et al., "DocMan: A Document Management System for Cooperation Support," Proceedings of the Twenty–Ninth Hawaii International Conference on System Science, Jan. 3–6, 1996, vol. 3, pp. 82–91.*
Extending the Networked Enterprise, "Overview of Extranet Standards," □□http://home.netscape.com/comprod/at_work/white_paper/extranetstds.html, (1997) pp. 1–5.*
Brian Barker, former CEO of Cambridge Vision Technology, Inc. M&A Today, a Newsletter for the Professional Intermediary vol. 8, No. 9, Sep. 1999.

* cited by examiner

Primary Examiner—Diane D. Mizrahi
(74) Attorney, Agent, or Firm—Greenberg Traurig LLP (57) ABSTRACT

Secure web-based method and system for communicating and managing project information are provided. The method allows for storing project-related information including project documentation in a database. The method further provides an interface screen available through a global communications network. The interface screen is configurable to identify a plurality of project tasks. The interface screen includes a datafield for defining a respective time window over which each of the tasks is to be performed by at least one project participant. The method allows for posting over the global communications network to selected project participants the plurality of project tasks. The posted plurality of project tasks is linkable to the database to retrieve project documentation that requires review by the selected project participants. A communicating step allows for communicating over the global communications network project status data for populating a project status screen indicative of the status of respective ones of the plurality of tasks.

44 Claims, 7 Drawing Sheets

COMPUTERIZED METHOD AND SYSTEM FOR COMMUNICATING AND MANAGING INFORMATION USED IN TASK-ORIENTED PROJECTS

This application claims the benefit of the filing date of provisional patent application, U.S. Ser. No. 60/182,796 filed Feb. 15, 2000.

BACKGROUND OF THE INVENTION

The present invention is generally related to a process and system for enabling electronic transmission, reception and management of information over a global communication network, such as the Internet. More particularly, the invention is related to a method and system for distributing electronic documents generally including sensitive information to selected users, to a method and system for communicating to such users tasks that need to be executed in connection with a project, and to a method and system for tracking and managing execution of such tasks.

People and businesses have become aware of the potential of the "Internet", sometimes referred to as a "global communications network", a digital communications network which connects computers all over the world. Unfortunately, security on the Internet remains imperfect, particularly since one of the Internet's design goals—an ability to route communications around damage to any node—makes it difficult to know or control the path by which any particular message will travel to reach its intended recipient, and who else will have access to it along the way.

Network software known as "groupware," such as "Lotus Notes," running on a computer network within a company (a "private network" or "Intranet"), permits individuals who have access to that particular network to work together efficiently by sharing documents, and editorial revisions to shared documents such as document updates, "redlined" revised drafts, and comments, as well as e-mail to create conference room collegiality and efficiency among employees actually separated in time and/or space without the security risks associated with the global network.

However, there is still no entirely satisfactory way for people at different companies or other entities to have the benefits of private network security, particularly for ad hoc alliances, i.e., different sets of entities coming together to function as one mega or meta entity, for the duration of some particular project. In such a case, the time and expense of actually wiring a network between two or more companies or other entities and agreeing on one common software package or standard presents a barrier to conventional network solutions. Simply using the Internet remains imperfectly secure for transmission of confidential information without some pre-arranged encryption and current methods for pre-arranging secure encryption processes have been cumbersome and unproductive.

Thus, there is a yet-unsolved problem of permitting different groups of companies or other entities to communicate securely over a global network for different projects, to quickly and inexpensively obtain the benefits of secure groupware in connection with each project, and to be able to add and drop entities without difficulty with respect to any particular project.

Relatively complex and fast-moving projects, such as due diligence projects, may involve coordination among various groups of entities or participants, often with diverging perspective and goals. As will be readily understood by those skilled in the art, one main purpose of any due diligence process in the context of merger and acquisition (M & A) transactions is to establish a thorough understanding of the M & A targets prior to the closing of the transaction. Typically, a vast amount of information needs to be reviewed, and analyzed by advisors, such as legal counsel, engineering consultants, accountants, insurance carriers, human resources consultants, etc. In some instances, some advisors may be in-house advisors as employees of a given entity and thus constitute an internal team. However, the advisors in many instances may be independently associated with external entities such as law firms or major accounting firms and thus a team of advisors may be comprised of either external teams or combinations of the above. Heretofore, due diligence documentation may have been prepared in the form of confidential paper documents or stored in compact-disk read-only memories ("CD ROMs") forwarded by non-electronic delivery, such as Federal Express, to the recipients. After reviewing the information, an acquiring entity, generally in consultation with legal counsel, accountants, and other advisors of its own, may notify the target of its willingness or unwillingness to move forward in connection with a given transaction. Often, the acquiring entity may request additional information or clarification from the target. Negotiations may then occur between the acquiring entity and the target generating more documentation prior to closing. Heretofore, such communications between the acquiring entity and the target may have been carried out by meetings, mail, telephone or telefacsimile.

Although some forms of paperless communication systems have been provided for concurrently interconnecting, on a project-by-project basis, members of a plurality of groups of parties. Some of those systems may have interfaces not readily conducive for secure Internet communication. Other systems may lack the ability to systematically post and track execution of tasks that need to be performed during the project. Yet other systems do not have the capability of actively notifying a user as to whether a document is available to be retrieved by that user over a global data communications network and/or whether a task assigned to that user is approaching a critical deadline. Thus, it would be desirable to provide a system and techniques which enables secure document transmission between users over a global communication network and which is not subject to the foregoing drawbacks. It would be further desirable to provide a system and techniques that would facilitate archival of the information collected in the project so that other users that may be involved in other subsequent projects, such as the integration team involved in the post M & A transaction, may gain the benefit of the historical information accumulated during the due diligence process.

BRIEF SUMMARY OF THE INVENTION

Generally, the present invention fulfills the foregoing needs by providing a method and system for securely communicating and managing project information among multiple project participants. More particularly, the invention includes a database located at a secure data storage facility and a computer program operable at such facility for enabling reception, storage and transmission of securely encrypted documents with access to the documents being enabled through a global computer network using conventional network browser software having encryption capability. For example, Microsoft Corporation Internet Explorer 4.0 having 128-bit encryption capability can be used to access the data storage facility. Any project participant can download a document to which he/she has access, make modifications as desired using conventional word processors and upload modified documents with comments to the storage facility. However, original documents at the facility may only be modified by selected persons having authorization to edit such originals. The invention may also provide read-only capability to selected project participants and preclude upload capability by other selected users. If desired, the invention may provide active notification to intended document reviewers of the presence of a document at the secure storage facility for review.

In one aspect thereof, the present invention provides a method for communicating and managing project information. The method allows for storing project-related information including project documentation in a database. The method further provides an interface screen available through a global communications network. The interface screen is configurable to identify a plurality of project tasks. The interface screen includes a datafield for defining a respective time window over which each of said tasks is to be performed by at least one project participant. The method allows for posting over the global communications network to selected project participants the plurality of project tasks. The posted plurality of project tasks is linkable to the database to retrieve project documentation that requires review by the selected project participants. A communicating step allows for communicating over the global communications network project status data for populating a project status screen indicative of the status of respective ones of the plurality of tasks.

In another aspect thereof, the present invention allows for providing a system for communicating and managing project information. The system comprises a database configured to store project-related information including project documentation. The system further comprises an interface screen available through a global communications network. The interface screen is configurable to identify a plurality of project tasks. The interface screen includes a datafield for defining a respective time window over which each of said tasks is to be performed by at least one project participant. A posting module is configured to post over the global communications network to selected project participants the plurality of project tasks. The posted plurality of project tasks is linkable to the database to retrieve project documentation that requires review by said selected project participants. A project status screen is indicative of the status of respective ones of the plurality of tasks. The project status screen is responsive to project status data communicated over the global communications by respective project participants.

DETAILED DESCRIPTION OF THE INVENTION

Background Terminology

Network Service Provider: A Network Service Provider is an entity which provides a hosted environment for one or more database(s) located at a secure data storage facility and for a computer program operable at such facility for enabling reception, storage and transmission of securely encrypted documents with access to the documents being enabled through a global computer network using conventional network browser software having encryption capability.

Project Participant: A Project Participant is anyone that is involved in the project. They may create new documents, access documents in an electronic document vault, update the status of tasks, create and respond to issues, and otherwise interact with the system of the present invention, generally referred to as Acquisition Trustee™ system.

Project Manager: The Project Manager takes overall responsibility for the project and owns the development of project tasks and task allocation. Project Managers may perform all of the interactions performed by other Project Participants, but they may also work in conjunction with the Network Service Provider administrator on project startup to allocate initial tasks and leverage historical information that the Network Service Provider may have archived from previously performed similar projects. They create new documents, access documents in the document vault, update the status of tasks, create and respond to issues, and otherwise interact with the system.

Network Service Provider Administrator: The Network Service Provider administrator is responsible for setting up the system for a client and ensuring that the system is robust and fully functional. The administrator is also responsible for performing regular security audits of databases to ensure that confidentiality and security rules are successfully obeyed.

As suggested above, the present invention can be used for many types of communications between different parties that are associating for a temporary transaction or project, but as competitors or for other reasons, are not suitable for a permanent communication network (LAN or WAN) as might be used for a single government agency or single corporation. Projects involving financial or M & A transactions are particularly suitable, although not necessarily the only sort of project appropriate, for the method of the instant invention.

Other transactions that may benefit from the techniques of the invention include but are not limited to:

loan syndication bond underwriting equity underwriting high yield debt placement private placement asset/corporate financing mortgage finance municipal finance asset-backed finance primary insurance reinsurance post acquisition integration divestiture deals projects dealing with regulatory approval of products and/or services For purposes of illustration and not of limitation, one exemplary embodiment of the present invention will be described below in the context of a due diligence project. In this example, a network service provider (not to be confused with an internet service provider or ISP), provides a central node for each virtual network in a collection of virtual networks corresponding to a plurality of different projects or transactions. The network service provider advantageously can provide a suitable level of security with respect to each of the shared transactions, among companies that in some instances may be vigorous competitors, with numerous confidential documents that the companies do not want uncontrollably shared among other members of the M & A project group or accessible by outsiders generally. While use of a separate network service provider, such as the assignee of the present invention, is specifically contemplated, alternatives within the scope of the instant invention are clearly possible, such as the acquiring entity, or the target providing the central node of virtual networks, and thus constituting the network service provider for one or more transactions.

Some embodiments of the system, particularly in the context of M & A transactions, provide fast and easy access for entities that provide M & A services. Those entities can simply pay a monthly subscription fee to the network service provider for each location, each deal, or each person accessing the network service provider's network. Users can access the service via a communications link provided by a private network provider or a public Internet access provider such as AOL or Time Warner Cable.

In one exemplary embodiment, the system provides a fully provisioned, turnkey service for users, e.g., financial firms, accounting firms, investment firms or other underwriting institutions. Once the financial or other underwriting institution has established an account with the service provider, documents in electronic form can be uploaded to the secure site maintained by the service provider. Within a relatively short period of time, the documents are accessible via an Internet connection to the network service provider. A variety of collaborative communications options can be chosen by the underwriting institution including e-mail, video broadcasting, video conferencing, and "white boarding" to augment interactive access to the documents.

Any entity or financial institution can be connected to any other entity via a "virtual link" that is established only for a limited time, such as the pre-closing period or post-closing period. These entities are authorized by the network service company and the target to access project information by way of the network service provider service. Individuals within the acquiring entity and other external organizations are issued passwords or other access codes which give them access only to those documentation that are approved for their review. The term "virtual link" is used to connote a system in which the user has essentially direct access using a password or other codes but which can be readily terminated by canceling the access codes.

In one aspect of the invention, the network service provider provides a secure virtual network (or "intranet") for the entities that support the secure electronic dissemination of confidential information documents, memoranda and related information and associated communications. As suggested above and illustrated in FIG. 1, the network service provider may provide a web-based computer communication system 8 for communicating and managing project-related information, such as may be used for closing a business deal involving multiple unrelated business organizations. By way of example, communication system 8 can provide a virtual network connection among an acquisition target 10, an acquisition entity 12, and respective groups of advisors 14 (only one shown) respectively selected by the acquisition entity and/or the target for each of a plurality of projects. Communications between entity 10 and target 12 may include various personnel such as their respective legal counsel team, financial advisors, and other advisors including external advisors relative to the acquisition entity and target. The foregoing communications among such diverse personnel may be in connection with implementation of the tasks for a respective due diligence project and, in accordance with the techniques of the present invention, may be carried out securely over the virtual network associated with the respective due diligence project.

Figure 1:
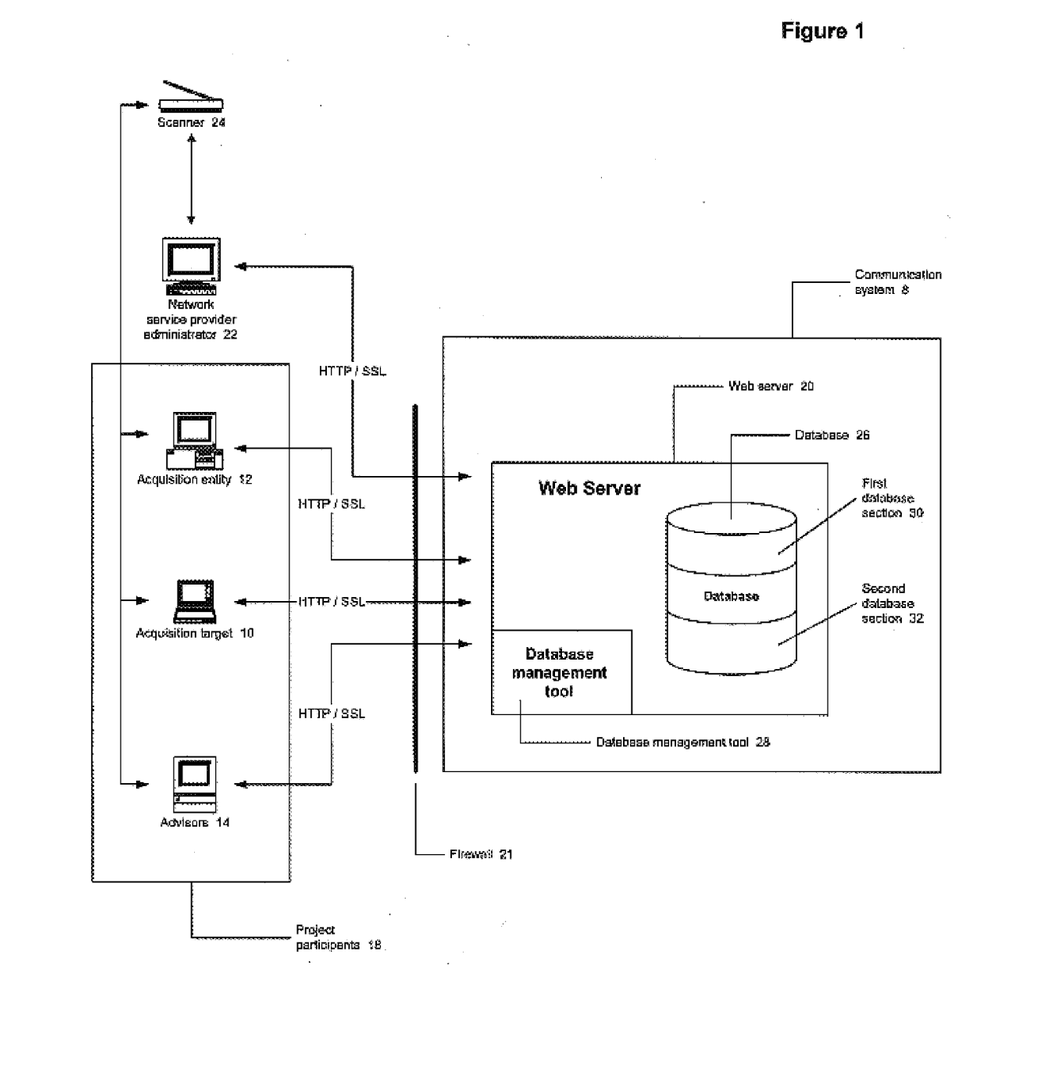
FIG. 1 is a block diagram showing one exemplary embodiment of a communication system in accordance with one aspect of the present invention.

Once the project documentation has been collected, it can be controllably distributed or disseminated electronically via a web server 20 loaded with suitable server software and protected from outside attack through a suitable firewall 21. Web server 20 is configured to permit distribution of the information over the virtual network to the users. A network service provider administrator 22 or project participant 18 using the system interacts with the system to load documents into a database 26 as self-contained document files (if necessary, either the administrator 22 or a project participant 18 using the system may scan any such paper documents using a suitable scanner 24). Administrator 22 or project participant 18 scans and verifies each document, and enters basic indexing information about each respective document into the system, such as document title, document folder, project identifier and/or other comments, etc. The person posting the document generally decides who gets access to that document and may add or change indexing information for the document. After the person posting the document has indicated who should receive access, the document will be instantly available to any authorized project participants 18.

Figure 2:
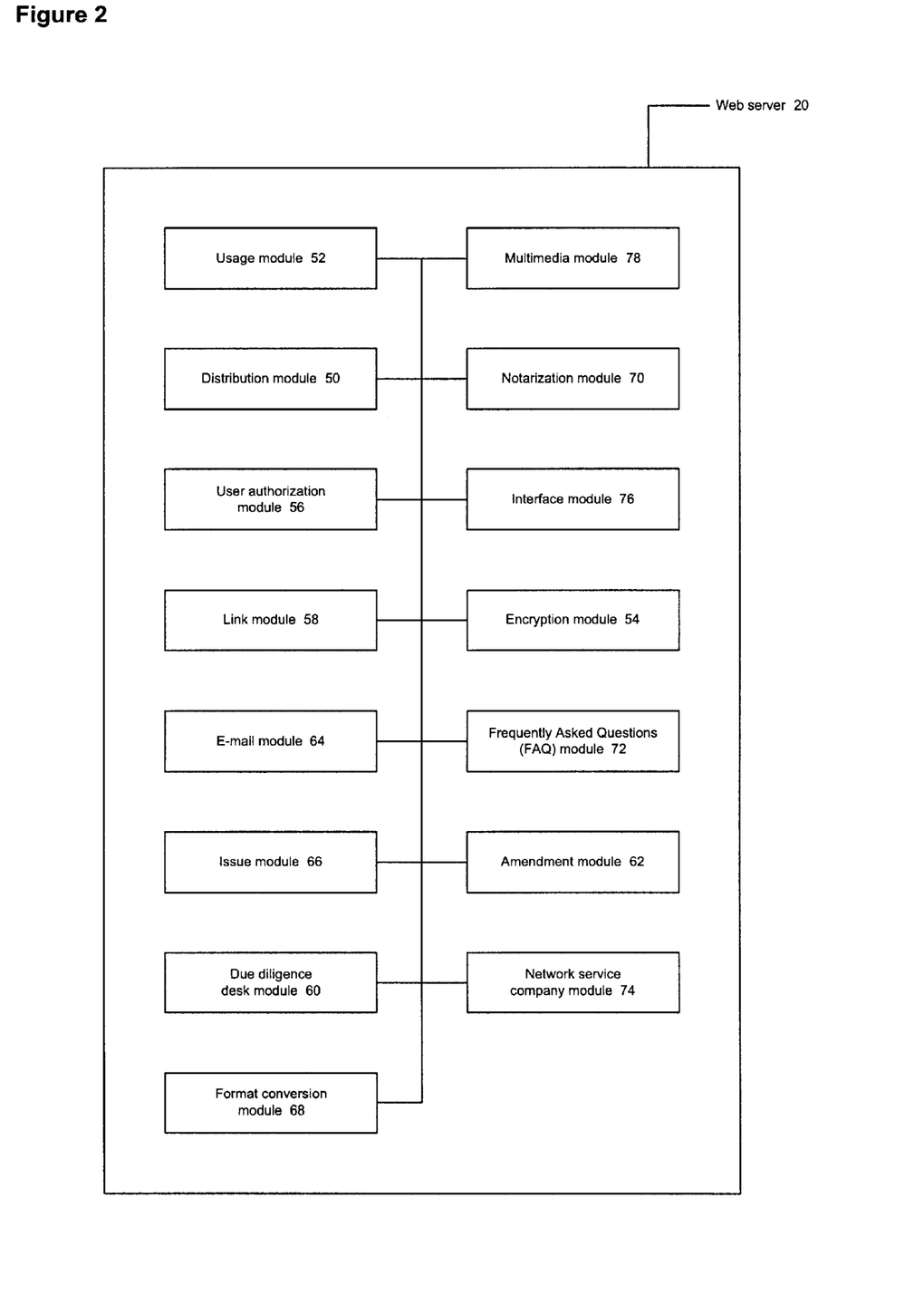
FIG. 2 is a block diagram showing exemplary operational modules of a web server that may be used by the communication system shown in FIG. 1.

FIG. 2 shows further exemplary features in connection with the server software which may be readily incorporated in web server 20. For example, a distribution module 50 allows web server 20 to electronically distribute the project documentation as well as secure communications among the project participants to enable them to perform the project efficiently. As suggested above, a usage module 52 may be provided in web server 20 to monitor the usage of each virtual network to permit client entities in a given virtual network to be billed for the virtual network service used in connection with projects of that client. Communication system 8 can set up and manage a plurality of separate virtual networks concurrently, with each such virtual network handling a different project.

Communication system 8 (FIG. 1) through web server 20 can offer a high level of security for all documents and information by employing, as needed, a private communication network, such as the "IBM Global Network" ("IGN"), AT&T or MCI, or other providers of substantially secure Internet connections, and by means of security and encryption technologies developed for intranets such as may be readily incorporated in an encryption module 54. It will be appreciated that the present invention need not be limited to a private communications network since the Internet could be used in lieu of the private network in situations where, for example, security considerations may not be as critical as the timeliness of the communication, as may occur if the private network is temporarily disabled. Additionally, web server 20 provides highly secure access control by way of a user authorization module 56 which allows only authorized personnel to access individual memoranda and related documents and communications through an interface module 76.

Web server 20 can give each entity the ability to electronically link or be interconnected via link module 58 with any number of external entities into a virtual network that may be established only for the time a project is active. Documents may be formatted in any document format. In one exemplary embodiment, documents may be formatted in Portable Document Format (PDF), such as may be readily implemented with a commercially available document exchange programs, such as Adobe Acrobat program. Other formats could be optionally accommodated using a suitable format conversion module 68. A multimedia module 78 may also be used to process any data to be sent over the virtual network suitable for presentation to participants in forms other than text such as audio, still or moving images, and the like. Further, a notarization module 70 may be provided so that authorized participants have the ability to electronically certify any electronic document that may need such certification. In one exemplary embodiment, notarization module 70 may incorporate electronic signature technology, such as that owned and developed by Bell Labs and made commercially available through their sales organization. Thus, the investors and external users may readily verify the authenticity of the alleged source of a given documents and attachments, if any. Further, such users may verify that the document contents have not been changed without authorization. As suggested above, a Frequently Asked Questions (FAQs) module 72, may conveniently allow authorized users to electronically create, post, and edit an electronic board containing FAQs in connection with a particular transaction. It will be appreciated that although the contents of a FAQ electronic board may contain some generic questions applicable to each transaction, in general the contents of such board may vary considerably based on the specific transaction being handled. A network service company module 74 may conveniently be used to display various data in connection with the network service company such as additional services that may be available by the network service company to the users.

Figure 3:
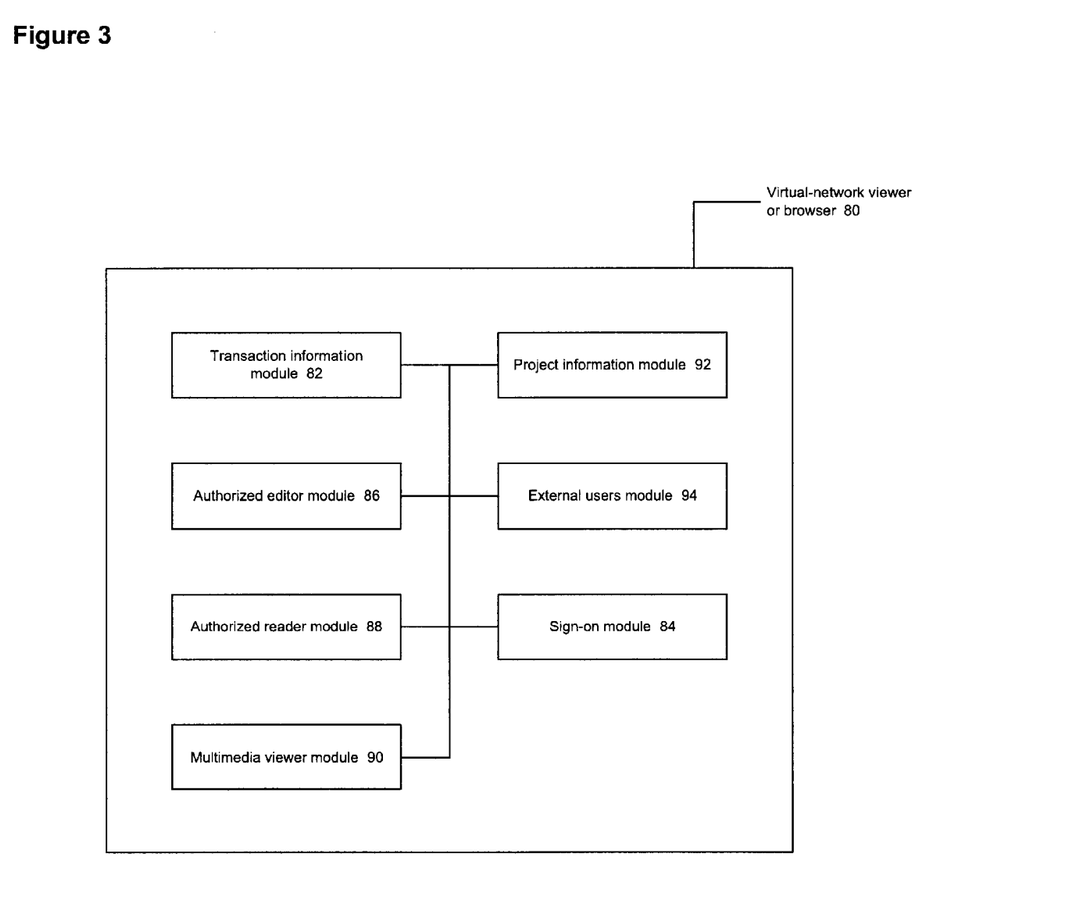
FIG. 3 is a block diagram showing exemplary operational modules that may be available to users authorized to access the web server of FIG. 1.

As shown in FIG. 3, a virtual-network viewer or browser 80 may conveniently provide the participants with an easy-to-use graphical interface to project information memoranda and other particularly confidential information on the network service company's virtual-network service. The virtual-network service provides identification of services of the network service company available over the virtual network as well as a variety of options for accessing and retrieving project information.

The virtual-network viewer includes a transaction identification module 82 that, for example, enables a participant to quickly find and access information with respect to those projects for which the acquiring entity has been authorized access by the appropriate targets. The virtual-network viewer can automatically provide any suitable connection to the user, such as a dial-up connection, to the virtual-network service through sign-on module 84. The viewer can also prompt the user to input one or more passwords or identifications which should be recognized by either an authorized editor module 86 or an authorized reader module 88 in order to access information on a database 26 (FIG. 1).

In one exemplary embodiment, sign-on module 84 may be configured to securely communicate and manage project information for a plurality of distinct projects through a global communications network. As suggested above, some of such projects may be sponsored by unrelated entities. A storing step allows the storing of project-related information for each of the plurality of distinct projects in a database. The project-related information may include project documentation. The data may further store a unique "sign-on" authentication credential to allow a project participant to access via a single "sign-on" action each distinct project to which that project participant has been approved. For example, upon verification of the authentication credential, the system may provide an interface screen available through the global communications network. The interface screen is configurable to identify a plurality of project tasks for each of said distinct projects to which the project participant has been approved.

The virtual-network viewer may also include a multimedia viewer module 90 configured to, for example, provide: viewing of interactive multimedia or mixed media memoranda through suitable decoders, such as audio decoders, Joint Photographic Experts Group (JPEG) still image decoders, and Moving Pictures Experts Group (MPEG) moving image decoders. The virtual-network viewer also supports various collaborative communications options such as e-mail, video conferencing and white boarding which are enabled for a given M & A transaction pursuant to instructions from any appropriate entity. Of course, the range of multimedia capability and the collaborative communications options will vary depending on the various groupware modules available to the end user. Depending of the level of authorization of a respective participant, and as will be described in greater detail below, a project information module 92 may conveniently allow that participant to quickly retrieve or post a vast amount of information for a given project. Similarly, an external user module 94 may respectively inform the participants of the external advisors involved in a given project.

It will be appreciated that the participants may conveniently use commercially available Internet software browser utilities such as the "Netscape Navigator" or "Microsoft Internet Explorer" to access the virtual-network service, since the virtual-network viewer is presently designed for compatibility with such Internet browsers. By way of example, a plug-in and secure socket layer ("SSL") can be provided by communication system 8 for additional security.

As will be appreciated by those skilled in the art, the browser software and plug-ins in the user computers may conveniently provide the following functions:

Access

X Access to the virtual-network-service host site through the subscribers existing Internet connection and Internet browser software, or through a suitable client software, such as "Lotus Notes" client software;

X Automated response to security and password inquiries;

Activation

X Prompt the user at a subscriber client to enter a password and any other input required for verification, such as a digital signature or key encryption codes;

X Automatically send the password and other information to the virtual-network-service host site;

X Log the user into the virtual-network-service host site and the relevant authorized databases once verification of the password is successfully completed;

Security

X Provide access security for Internet browser clients using advanced security procedures;

X Provide transmission security for Internet browser clients including encryption/decoding of transmitted files;

X Require frequent subscription renewal to restrict subscriber access to short intervals such as monthly intervals;

Viewing

X For Internet browser clients, permit viewing of Standard Generalized Markup Language (SGML) pages, such as Hyper Text Markup Language (HTML) or Xentensible Markup Language (XML) pages and play back of multimedia elements;

X Permit viewing of virtual-network-service company coded, multimedia loan information memoranda and related information by authorized users only;

X Permit viewing of related documents and files such as e-mail Messages and attachments, and v-mail communications by authorized users only;

Communications

X Transmit and receive e-mail for public forums and for private communications among designated participants;

X Receive and play back video-mail communications;

X Enable participation in two-way, real-time collaborative communications such as video conferencing and white boarding regardless of client software being used.

Depending on a variety of factors, some participants or some projects may require different communication bandwidths in order to access the virtual-network service and to download information with acceptable latency for their own unique needs. The network service company can consult with a participant to help that participant determine the best possible communications options for its particular needs, taking into account the participant's existing communications capabilities, connections to private communication networks and other factors.

A wide range of communication-link services and options are presently available to businesses. Many of these services are available almost ubiquitously throughout the United States. The communication link services generally vary in cost depending on bandwidth, distance between nodes, traffic, and other factors. Some common types of communication links today are:

modem, with a maximum bandwidth of 56.6 Kbps or so,

Integrated Services Digital Network (ISDN), with maximum bandwidths of 64 Kbps and 128 Kbps, T-1, with a maximum bandwidth of 1.544 Mbps or so, Asynchronous Digital Subscriber Line, with a maximum bandwidth of up to 1.5 Mbps or so, Cable Modem, with a maximum bandwidth exceeding 30 Mbps.

Future improvements in high-speed communication links and modems can be expected to further improve performance of the present invention.

ISDN and T-1 connections are substantially dedicated communication links and would enable the participants to link directly to communication system 8 for a relatively moderate monthly fee. Conversely, the link could be provided via dial-up communications utilizing the public switched telephone network (PSTN) at lower monthly fees. It will be appreciated, however, that the communications speed over the public switched telephone network would be slower relative to the ISDN and T-1 connections, especially for multimedia information. There are other high-bandwidth links available as well from a variety of carriers and Internet access providers.

As suggested above, a private communication network such as the "IBM Global Network" can also provide participants with additional security and with fast access to the virtual-network service. As will be appreciated by those skilled in the art, computer communication system 8 conveniently establishes an intranet or extranet when using such private communication network, as indicated generally in FIG. 1. Such an intranet or extranet can have the look-and-feel of the Internet, without compromising the security of the information exchanged or distributed therethrough. Thus, while participants can have the option of accessing the virtual-network service of the network service company via their existing communications links and/or Internet access, they can also elect to have local access provided by the private communication network. Those companies that may not want to use their existing communications lines for access to the network service company or those companies that do not currently have access to the Internet or sufficient bandwidth to handle the virtual-network service in addition to their normal Internet access can utilize the services of the private communication network for access to the network service company intranet.

As suggested above, many companies access the Internet either through dial-up or dedicated communications lines. The virtual network is effectively an intranet or extranet, so anyone accessing the Internet can quickly become a user of the virtual-network service using his or her existing skills, software, and Internet access provider. However, in contrast to the public accessibility of the Internet, end users must have a subscription to the virtual-network service, and/or have a valid password assigned by their company for access to the service.

As will be appreciated by those skilled in the art, participants will want to ensure that their employees who have been authorized to use the virtual-network service are able to access the service and to view and download information quickly. Although most of the information that can be accessed and downloaded may be text data, there are a variety of factors that may impact the speed with which users can retrieve the information they want.

For the convenience of the end users, some segments of the project memoranda offered through the virtual-network service may be designed as interactive multimedia documents that will include video, graphics, audio and other multimedia elements. Multimedia communications provide the end user with a wide variety of information in addition to that provided by a standard text memorandum. However, multimedia information can be substantially taxing on a communications virtual network. A participating entity should take this into consideration as it is assessing its communications requirements.

Participating entities may be able to choose from a variety of collaborative communications options that enable them to communicate with external entities via a virtual network of the network service company. The collaborative communications options let a participating entity to take advantage of the flexibility of the virtual networks established by the network service company to speed and improve communications among the entities on the network.

Collaborative communications can be supported on virtual networks of the network service company, notwithstanding that participating entities may vary in their ability to support the various communications options depending on their communications capability and particular interfaces to the virtual-network service.

By way of example, in the context of a due diligence process and returning to FIG. 2, a due diligence desk of a participating entity, i.e., one or more individuals authorized to be responsible for the management of any given due diligence process, is able to broadcast and/or post project task processed by a due diligence desk module 60 to other participants. Further, amendment data processed by an amendment module 62 may be used to effectively make changes to information memoranda. The amendment action can be then conveniently announced via e-mail using E-mail module 64 for providing designated participants with up-to-the-minute project information about a due diligence project. Amendments or messages can be appended to the information memorandum at the host site of the network service company where they can ordinarily be viewed by anyone accessing the virtual-network service who is authorized to access the financial information memorandum. E-mail messages or amendments can also be downloaded for printing or for attachment to local documents associated with the memorandum. Similarly, comment or other issue data in connection with a due diligence project may be processed through an issue module 66 for appropriate distribution to authorized users.

Posting of such messages or amendments can now be securely done through the communications system without having to expend substantial resources, such as paper for hard copies or the relatively large staff that would be required to generate and track such hard copies. Participating entities can send video clips to advisors and to organize video conferencing sessions. It will be understood however that sufficient bandwidth must be available at participating entities to support real time, full duplex video transmission in order for a video conferencing session to occur. A lead entity can set up connections with associated entities for white boarding and for real time collaborative annotation of documents.

As shown in FIG. 1, a database management tool 28 using software techniques well known to those skilled in the art, allows for electronically coupling web server 20 to database 26 made up of a first database section 30 where the project-related data may be conveniently stored. Database 26 is further made up of a second database section 32 for storing user demographic data. For example, in addition to the authorized project managers, participant access to first database section 30 could be selectively controlled or categorized into distinct types, e.g., Editor and Reader.

As can be seen, the system provides a secure site for placing documents and messages to be transmitted over the secure virtual network and allows authorized users to read or edit messages according to their level of authorization. Any documents that are edited are immediately available on the system so that other persons involved in a particular deal or project scenario has access to the edited or modified documents immediately without having to wait for delivery of hard copies of these documents via a courier service. In addition, the system may provide tracking of each document to allow the participants to see who has had access to the messages and documents and who has modified or edited any of the documents.

Figure 4:
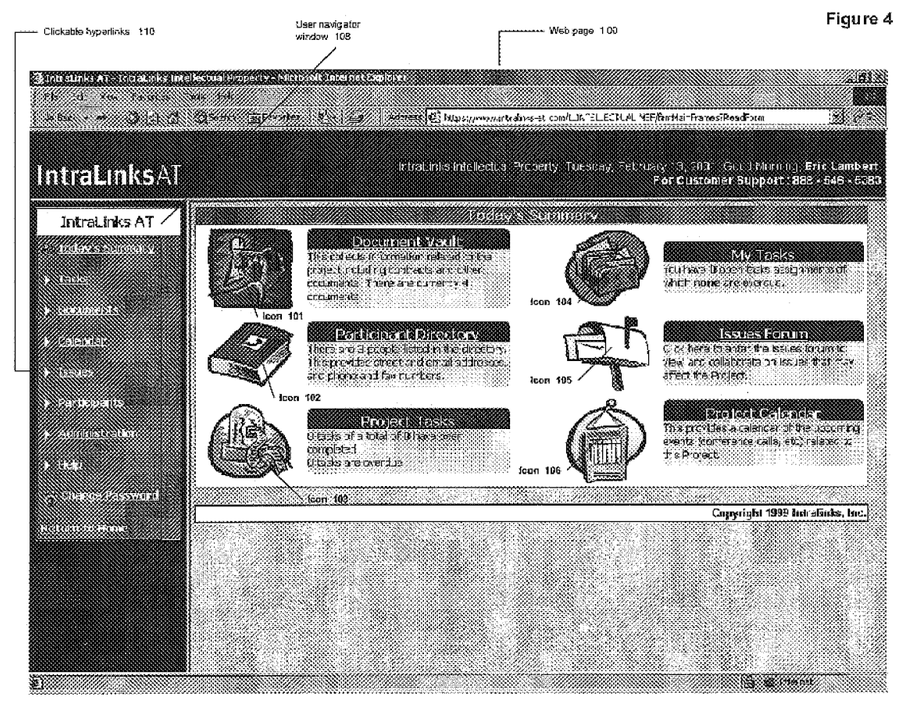
FIGS. 4–7 respectively show exemplary interface screens for communicating data among the various users of the communication system.

FIG. 4 shows an exemplary web page 100 including a plurality of clickable icons, e.g., icons 101–106 representative of functionality provided by the system. Web page 100 further includes a user navigator window 108 including a plurality of clickable hyperlinks 110. Icon 101 provides access to an on-line "Document Vault" that allows for providing immediate access to the latest draft of documentation, memoranda, etc., to participants regardless of their physical location across the world. It will be appreciated that such documentation may be now be readily available after completion of the project to subsequent users. For example, contracts, leases, transaction analysis, etc., and other documentation that previously would be typically deposited in inaccessible three-ring binders can now become available at the click of a mouse. It will be appreciated that this capability facilitates subsequent projects. For example, it would accelerate the integration process, subsequent to the closing. It will be appreciated that no software needs to be distributed to access this information. As suggested above, all that is required is a proper security clearance and browser.

Icon 102 provides access to a user or participant directory that conveniently lists basic user demographic information, their role in the project, and their rights to access components of the system. It will be appreciated that because numerous participants may be involved in a transaction, in the absence of this functionality, it would be difficult for all participants to keep track of the contact information of other participants. Using manual systems that aren't shared, each participant would need to ensure that they individually keep track of the contact information of other participants. Even if the contact information were to be centrally tracked by an administrator, the information still would need to be distributed somehow whether through a fax or through e-mail. By way of comparison, the Acquisition Trustee system maintains an on-line user directory that is accessible to all project participants. As suggested above, the system maintains information about each participant including basic demographics like name and address, email, fax, and phone, as well as system access rights. In one exemplary embodiment, users are now able to update their demographic information, but will not be able to change their access rights. The Network Service Provider Manager and the Project Manager have the capability to change user access rights and to remove or add users.

Icon 103 provides access to a "Project Task Manager" that ensures that no important details fall through the cracks and allows for capturing best practices for use on future similar projects by helping to "automatically" codify tasks needed for performing a successful project. The Acquisition Trustee system is configurable to manage tasks, task allocation, and task status among the participants in the project. As suggested above, during a typical due diligence process, many different people are involved from numerous different constituencies including the acquiring company, the acquired company, lawyers, accountants, due diligence advisors, etc. With the involvement of multiple participants that may also have other concurrent business responsibilities, it's important to track and manage tasks to ensure that the due diligence process is conducted expediently. Previously task tracking and management was performed manually with paper-based systems and project status meetings. This is insufficient because it makes it difficult to get a picture of the current state of the overall project effort, and because it doesn't provide any pro-active task tracking and management without manual intervention.

By way of comparison, the Task Project Manager of the present invention has the capability to define and allocate tasks among the project participants. By way of example, the initial setup of the project, the participants are assisted by the Network Service Provider administrator. This administrator may assist the Project Manager by providing a list of standardized Due Diligence questions that will be assigned as tasks to Due Diligence participants. The Project Manager may also input tasks that are not part of the standard list of questions. It will be appreciated that in one of the advantageous features of the present invention, the standardized questions may be updated and/or supplemented, as the system archives historical data for similar types of projects. That is, the system may facilitate adjusting the plurality of tasks for new similar projects in view of expert analysis performed on the historical project issue data since one could learn from issues having developed during past performance of similar projects. In one exemplary embodiment, the expert analysis may be performed by one or more experts in a particular field. It is contemplated, however, that such expert analysis could be computerized using a suitable artificial intelligence tool.

To ensure that tasks are actively tracked and are completed within specified timeframes, the system is configurable to output warning and overdue notifications to participants. For each task, the Project Manager may define warning and overdue parameters that include who should be notified for each task and how far in advance a warning message should be sent. If the Project Manager wants to review the status of tasks that are allocated, that manager has the ability to view the list of tasks in the system with the current task status. As suggested above, icon 103 provides access to project participants to view their respective list of tasks in the system. They can view the details of a particular task and update the task status as they complete tasks or run into roadblocks that may affect task completion. The Project Manager can view all of the allocated tasks with status, and can re-allocate tasks as necessary to ensure the prompt and successful completion of the process.

Figure 5:
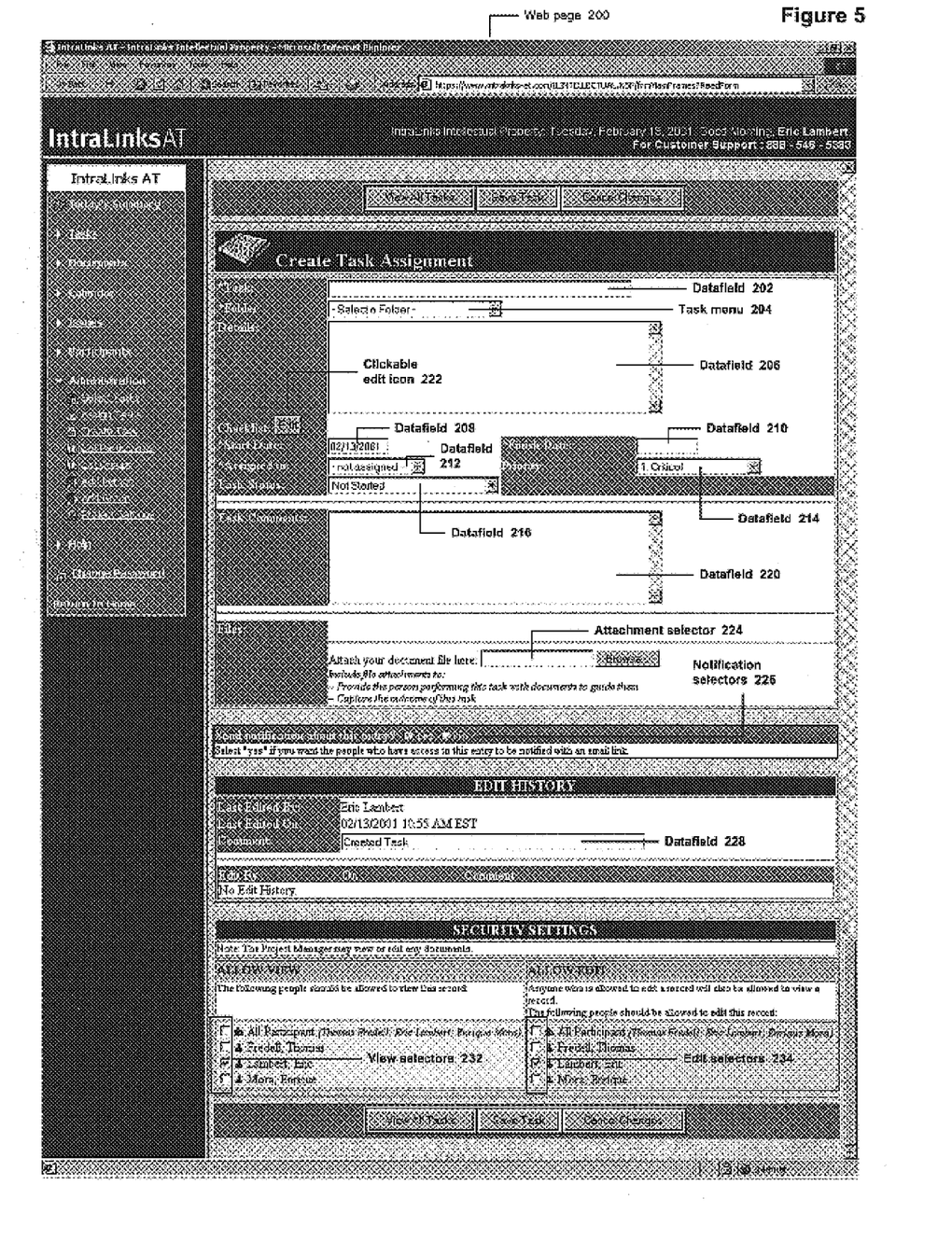

FIG. 5 illustrates an exemplary Web page 200 that may be provided for inputting task data into the "Project Task Manager". As suggested above, web page 200 includes a datafield 202 for identifying the task. A task menu 204 may be used for classifying the task into a respective group of related tasks. A datafield 206 allows for providing detailed information in connection with each respective task. Datafields 208 and 210 are respectively provided for identifying a time window during which the time window should be performed. Datafield 212 allows for identifying the assignee of the task. Datafield 214 allows for assigning a criticality level to the task, e.g., critical, normal, deal stopper, etc., Datafield 216 allows for assigning a respective task status, such as not started, in process, completed, etc. Datafield 220 allows for posting comments in connection with a task. A clickable edit icon 222 allows for editing task data in connection with a task being performed, such as whether the criticality level of the task has changed, or the time window has changed, or new team members have been added, etc. An attachment selector 224 allows for attaching any appropriate documents for a respective task. Notification selectors 226 allows for selectively notifying one or more project participants via E-mail or any other communication means of the most recent task entry. A datafield 228 allows for displaying edit history in connection with a task. View selectors 232 allow for assigning viewing rights for the task to selected project participants. Edit selectors 234 allow for assigning editing rights for the task to selected project participants.

Icon 104 (FIG. 4) provides access to a Web page configured to provide a participant a snapshot of their respective status including various types of interaction with the system. For any individual project participant, in the past has been difficult to keep track of everything that's going on. For people that have responsibility for part of the project as well as responsibility to conduct their day-to-day jobs at the same time, it can be particularly difficult to ensure that nothing is overlooked.

By way of comparison, the Acquisition Trustee system presents the user with a single, tightly integrated status Web page that shows the user everything that such user is involved within the system. An exemplary implementation of the status screen could incorporate a snapshot including new documents that have been posted, overdue tasks and tasks due this week, responses to issues in the discussion forum, people that have recently been added to the due diligence team, and upcoming meetings or teleconferences for the week.

Icon 105 provides access to a web page that enables on-line, not necessarily real-time, discussions regarding issues that may develop during the project. Often projects may encounter issues that if not appropriately addressed may affect the viability of the project. Previously, people discussed these issues by sending e-mails or leaving voice-mails with other participants in the process. Consequently, information about issues that arise is scattered among multiple people in multiple places. Prior to the present invention, it is believed that there were no commonly accessible forum to tracks issues, issue status, and issue resolution information. This was problematic because important issues, which could result in significant future legal liability, may have been unintentionally overlooked, or input may not have been received from the appropriate project participants.

By way of comparison, the present invention enables project participants to have an on-line forum that allows them to post issues or respond to issues posted by other participants. The system will include the capability to restrict certain issues so that only a subset of the participants will be able to view and respond to an issue. Issues may also be based on documents in the document vault, tasks, or on any other element in the system. Issues will also include an issue status that indicates whether the issue is open or closed.

Figure 6:
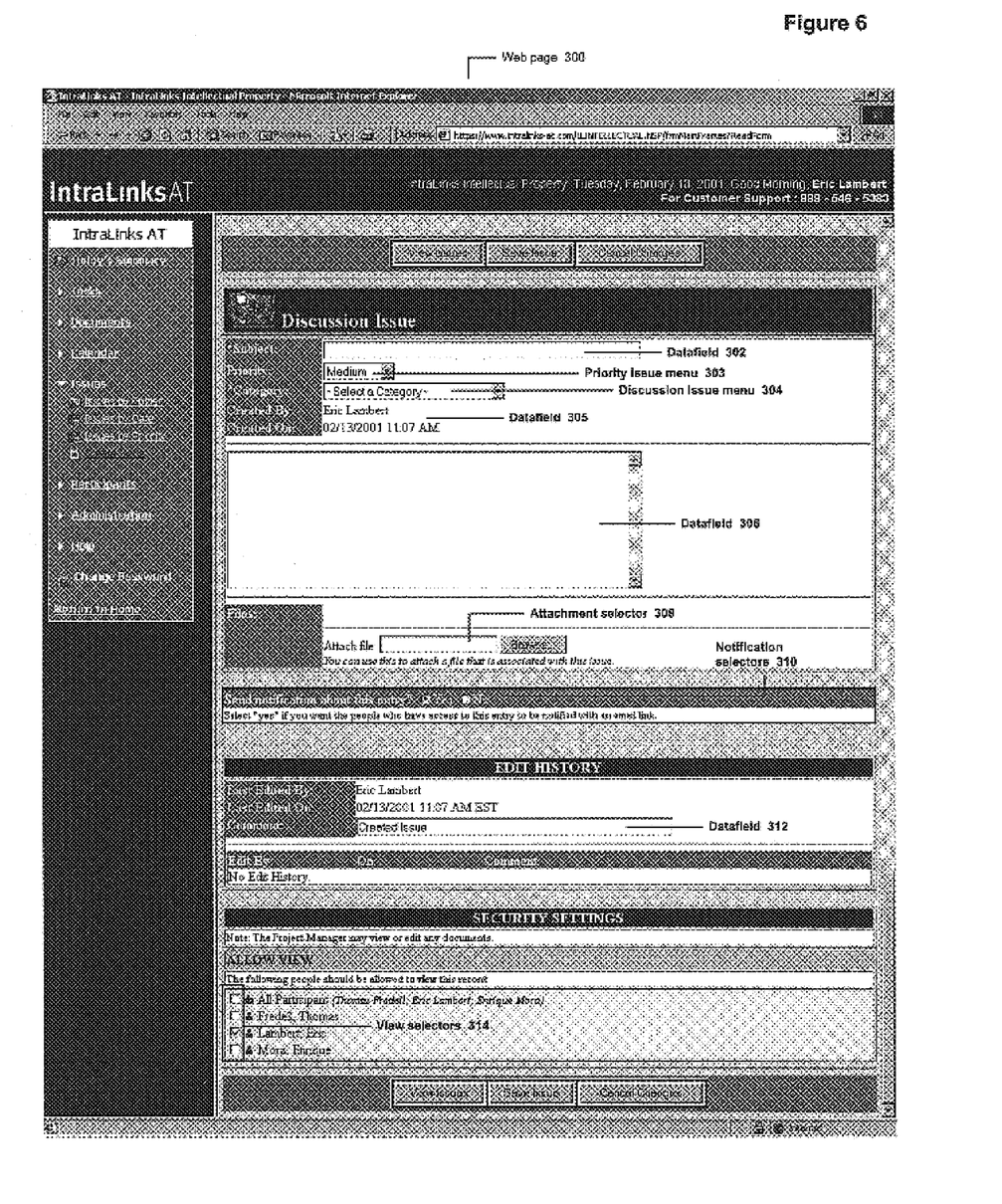

FIG. 6 illustrates an exemplary Web page 300 that may be provided for inputting task data into the "Discussion Issue" module. As suggested above, web page 300 includes a datafield 302 for identifying the discussion issue. A discussion issue menu 304 may be used for classifying the discussion issue into a respective group of related discussion issues. A datafield 305 allows for displaying the originator of the discussion issue. A datafield 306 allows for providing detailed information in connection with each respective task. An attachment selector 308 allows for attaching any appropriate documents for a respective discussion issue. Notification selectors 310 allows for selectively notifying one or more project participants via E-mail or any other communication means of the most recent issue discussion entry. A datafield 312 allows for displaying edit history in connection with a task. View selectors 314 allow for assigning viewing rights for the discussion entry to selected project participants.

Icon 106 (FIG. 4) provides access to a shared project calendar that allows participants to plan meetings, teleconferences, or other events that will take place. Typically, as the project advances, people will schedule events such as meetings or conference calls. The meetings may require the participation of multiple people involved in the project effort. Without a shared calendar that aggregates information about upcoming events, it would be difficult to ensure that all participants will know about scheduled events.

Figure 7:
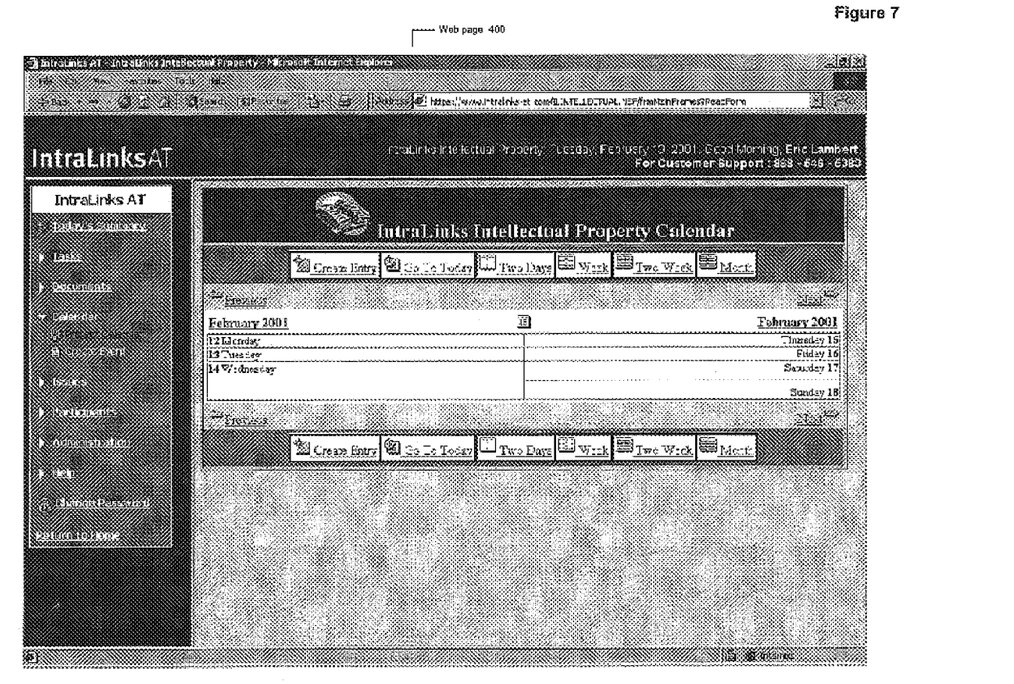

The Acquisition Trustee system allows for maintaining a shared calendar that allows every participant to see the current schedule for project-related events. In one exemplary embodiment, any project participant is able to post a new event and indicate who is requested to attend the event and who should be allowed to view information about the event. Participants can also cancel or change events as necessary. People requested to attend will be notified of new events and changed or deleted events. FIG. 7 illustrates an exemplary Web page 400 that may be provided for inputting task data into the "Project Calendar" module.

It will be appreciated that the level of information posted on the various Web pages, e.g., Web pages 100, 200, 300 and 400, displayable by the system, may comprise a variable level of detail to reflect a desired level of information to be communicated to any selected project participant. For example, for a given project it may be desirable that certain detailed project status information be posted only to a selected subset project participants, as opposed to the full set of project participants. Similarly, in some instances it may be desirable not to post every calendar entry or project issue to every project participant. Thus, while the system of the present invention provides a versatile tool for communicating and managing a vast amount of project information, it will be appreciated that such information may be communicated in multiple levels of detail to the various project participants.

As shown in FIG. 4, the hyperlink labeled "HELP" allows users to get on-line context-sensitive help when they require assistance while using the system. As users interact with the Acquisition Trustee, they may not understand how to accomplish certain tasks and they may run in to functional problems. From any screen in the Acquisition Trustee system, the user will have the ability to request help. When they request help, they will be brought to a screen that will allow them to view help details given their current context in the application.

In operation, it is believed that the Acquisition Trustee system of the present invention allows for systematically integrating most or all of the following functions:

Provide a project status overview that gives a user a snapshot of the project as it applies to them and their role in the process Provide a mechanism to group participants into work teams and match the teams to information that they can access Allow individuals to be grouped into multiple work teams Provide a searchable document database where electronic documents can be entered by personnel of the Network Service Provider and retrieved by authorized project participants Provide a shared discussion forum where project participants can raise and respond to project issues Provide the capability to have private discussions or discussion topics that are only available to a user-specified group of people Provide notifications when people make responses to your issues Provide an on-line directory of project participants including standard demographics, their position on the team as a project manager or basic contributors, and their access to different systems areas, such as scanned documents, but not task administration Provide a secure, restricted access area where project participants can collaborate on a parts of a recommendation document for the acquisition Provide the ability for a project manager to create, assign, and reassign tasks to project participants Provide a repository of standard task templates grouped by industry and by function Allow the project manager to select from a standardized list of questions to create and assign tasks to individuals on the project team Provide the capability for a user to see a list of their tasks with the task description, status, and due date Provide the capability for users to edit their tasks and indicate status changes and to attach supporting materials Provide the capability for a user to print a full list of their current tasks with details Provide the project manager with an interface that allows them to see all of the tasks and current task status Provide notifications that let people know when tasks are about to become overdue Provide notifications that let people know when a task is overdue, and include provisions for escalations of the notifications to the project manager or other people Allow the discussion to be linked to scanned documents, electronic documents, or task assignments Allow faxed documents to be incorporated into the document repository Include on-line help that assists the user to understand how the system should be properly used As documents are revised, allow document revisions to be stored by the system, e.g., provide an audit trail that tracks changes to tasks, documents, issues Provide information that helps people to complete their tasks, including steps for each task and links to information from due diligence manuals or resources Provide robust security and user log-ins Allow users to view a calendar that lists events such as meetings or teleconferences that have been scheduled for due diligence participants Provide a due diligence repository of task templates storing standard customer checklists and prior due diligence checklists to allow customers to reuse tasks from previous similar projects The present invention can be embodied in the form of computer-implemented processes and apparatus for practicing those processes. The present invention can also be embodied in the form of computer program code including computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. When implemented on a computer, the computer program code segments configure the computer to create specific logic circuits or processing modules.

It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A method for communicating project information stored in a storage means among a plurality of project participants, which plurality of project participants form a full set of project participants, comprising:

identifying each of the plurality of project participants forming the full set of project participants;

identifying at least one project participant selected from the full set of project participants to form a project participant subset;

providing an interface to each of the project participants forming the full set of project participants;

configuring the interface provided to each project participant forming the full set of project participants to identify at least one non-exclusive project element, wherein each identified non-exclusive project element has associated therewith at least one item of project data;

linking each non-exclusive project element identified by the interface to each associated item of project data stored in the storage means;

downloading from the storage means, upon selection of a given non-exclusive project element identified by the interface, at least one item of project data associated with the given non-exclusive project element;

configuring the interface provided to each project participant forming the project participant subset to identify at least one exclusive project element which is not identified to a project participant not selected to form the project participant subset, wherein each identified exclusive project element has associated therewith at least one item of project data;

linking each exclusive project element identified by the interface to each associated item of project data stored in the storage means; and downloading from the storage means, upon selection of a given exclusive project element identified by the interface, at least one item of project data associated with the given exclusive project element.

2. The method of claim 1, wherein each item of project data is selected from the group including: a) a project document; b) a project task; c) a calendar entry; d) a discussion thread; and e) project issue data.

3. The method of claim 2, wherein each project document is in the form of a computer file.

4. The method of claim 3, wherein the computer file includes one of at least text data, binary data, still image data, moving image data, and audio data.

5. The method of claim 2, further comprising: (a) assigning at least one of responsibility for each of the project elements and access to each of the project elements to at least one project participant, and; (b) configuring the interface provided to a given project participant to identify at least one project element assigned to the given project participant.

6. The method of claim 5, further comprising configuring the interface provided to a given project participant to identify, for at least one project element assigned to the given project participant, a datafield for indicating a time threshold selected from the group including: a) a time window over which a project task is to be performed by at least one project participant; and b) a time cutoff by which a project task is to be performed by at least one project participant.

7. The method of claim 6, wherein at least one of the project tasks is from a database of historic project tasks.

8. The method of claim 5, further comprising configuring the interface provided to a given project participant to identify, for at least one project task associated with a given project element assigned to the given project participant, project status data associated with the project task.

9. The method of claim 8, wherein the project status data includes data indicative of whether a project task associated therewith is complete.

10. The method of claim 8, wherein the project status data is identified at one of at least two levels of detail.

11. The method of claim 5, further comprising configuring the interface provided to a given project participant to identify a calendar entry indicative of at least one scheduled event.

12. The method of claim 5, further comprising configuring the interface provided to a given project participant to identify at least one item of project data at one of at least two levels of detail.

13. The method of claim 5, further comprising configuring the interface provided to a given project participant to identify project issue data.

14. The method of claim 5, further comprising configuring the interface provided to a given project participant to identify, in a sorted order, at least one of: a) the project elements; and b) the items of project data.

15. The method of claim 14, wherein the sorted order is selected from the group including: a) alphabetical; b) reverse alphabetical; c) chronological; and d) reverse chronological.

16. The method of claim 5, further comprising:

configuring the interface provided to a given project participant to identify, for at least one project element assigned to the given participant, a datafield for indicating a time threshold selected from the group including: a) a time window over which a project task is to be performed by at least one project participant, wherein the time window has a threshold window start and a threshold window end; and b) a time cutoff by which a project task is to be performed by at least one project participant;

configuring the interface provided to a given project participant to identify, for at Least one project element assigned to the given project participant, project status data associated with a given project task; and providing a warning message to at least one of the project participants when the project status data indicates that the given project task is not complete and a current time equals a time selected from the group including: a) a time within a predetermined warning window of the threshold window end; and b) a time within a predetermined warning window of the time cutoff.

17. The method of claim 5, wherein each identified project element includes at least one of: a) a link to an item of project data; b) an indicator identifying which of the project participants have access thereto; and c) an indicator identifying a project status of at least one of the items of project data associated therewith.

18. The method of claim 1, wherein at least some of the project information relates to a transaction selected from the group including: a) a loan syndication transaction; b) a bond underwriting transaction; c) an equity underwriting transaction; d) a high yield debt placement transaction; e) a private placement asset transaction; f) a corporate financing transaction; g) a mortgage financing; h) a municipal financing; i) an asset backed financing; j) a primary insurance transaction; k) a reinsurance transaction; l) an acquisition transaction; m) a divestiture transaction; n) a transaction dealing with regulatory approval of a product; and o) a transaction dealing with regulatory approval of a service.

19. The method of claim 1, wherein at least one of the steps of providing an interface and downloading is carried out via a communications network.

20. The method of claim 19, wherein the communications network is the Internet.

21. The method of claim 1, wherein the interface comprises one or more interface screens.

22. A system for communicating project information stored in a storage means among a plurality of project participants, which plurality of project participants form a full set of project participants, comprising:

means for identifying each of the plurality of project participants forming the full set of project participants;

means for identifying at least one project participant selected from the full set of project participants to form a project participant subset;

means for providing an interface to each of the project participants forming the full set of project participants;

means for configuring the interface provided to each project participant forming the full set of project participants to identify at least one non-exclusive project element, wherein each identified non-exclusive project element has associated therewith at least one item of project data;

means for linking each non-exclusive project element identified by the interface to each associated item of project data stored in the storage means;

means for downloading from the storage means, upon selection of a given non-exclusive project element identified by the interface, at least one item of project data associated with the given non-exclusive project element;

means for configuring the interface provided to each project participant forming the project participant subset to identify at least one exclusive project element which is not identified to a project participant not selected to form the project participant subset, wherein each identified exclusive project element has associated therewith at least one item of project data;

means for linking each exclusive project element identified by the interface to each associated item of project data stored in the storage means; and means for downloading from the storage means, upon selection of a given exclusive project element identified by the interface, at least one item of project data associated with the given exclusive project element.

23. The system of claim 22, wherein each item of project data is selected from the group including: a) a project document; b) a project task; c) a calendar entry; d) a discussion thread; and e) project issue data.

24. The system of claim 23, further comprising: (a) means for assigning at least one of responsibility for each of the project elements and access to each of the project elements to at least one project participant and; (b) means for configuring the interface provided to a given project participant to identify at least one project element assigned to the given project participant.

25. The system of claim 24, further comprising means for configuring the interface provided to a given project participant to identify, for at least one project element assigned to the given project participant, a datafield for indicating a time threshold selected from the group including: a) a time window over which a project task is to be performed by at least one project participant; and b) a time cutoff by which a project task is to be performed by at least one project participant.

26. The system of claim 24, further comprising means for configuring the interface provided to a given project participant to identify, for at least one project task associated with a project element assigned to the given project participant, project status data associated with the project task.

27. The system of claim 26, wherein the project status data includes data indicative of whether a project task associated therewith is complete.

28. The system of claim 26, wherein the project status data is identified at one of at least two levels of detail.

29. The system of claim 24, further comprising means for configuring the interface provided to a given project participant to identify a calendar entry indicative of at least one scheduled event.

30. The system of claim 24, further comprising means for configuring the interface provided to a given project participant to identify at least one item of project data at one of at least two levels of detail.

31. The system of claim 24, further comprising means for configuring the interface provided to a given project participant to identify project issue data.

32. The system of claim 24, further comprising means for configuring the interface provided to a given project participant to identify, in a sorted order, at least one of: a) the project elements; and b) the items of project data.

33. The system of claim 32, wherein the sorted order is selected from the group including: a) alphabetical; b) reverse alphabetical; c) chronological; and d) reverse chronological.

34. The system of claim 25, wherein at least one of the project tasks is from a database of historic project tasks.

35. The system of claim 24, further comprising:

means for configuring the interface provided to a given project participant to identify, for at least one project element assigned to the given participant, a datafield for indicating a time threshold selected from the group including: a) a time window over which a project task is to be performed by at least one project participant, wherein the time window has a threshold window start and a threshold window end; and b) a time cutoff by which a project task is to be performed by at least one project participant;

means for configuring the interface provided to a given project participant to identify, for at least one project element assigned to the given project participant, project status data associated with a given project task; and means for providing a warning message to at least one of the project participants when the project status data indicates that the given project task is not complete and a current time equals a time selected from the group including: a) a time within a predetermined warning window of the threshold window end; and b) a time within a predetermined warning window of the time cutoff.

36. The system of claim 24, wherein each identified project element includes at least one of: a) a link to an item of project data; b) an indicator identifying which of the project participants have access thereto; and c) an indicator identifying a project status of at least one of the items of project data associated therewith.

37. The system of claim 23, wherein each project document is in the form of a computer file.

38. The system of claim 37, wherein the computer file includes one of at least text data, binary data, still image data, moving image data, and audio data.

39. The system of claim 22, wherein at least some of the project information relates to a transaction selected from the group including: a) a loan syndication transaction; b) a bond underwriting transaction; c) an equity underwriting transaction; d) a high yield debt placement transaction; e) a private placement asset transaction; f) a corporate financing transaction; g) a mortgage financing; h) a municipal financing; i) an asset backed financing; j) a primary insurance transaction; k) a reinsurance transaction; l) an acquisition transaction; m) a divestiture transaction; n) a transaction dealing with regulatory approval of a product; and o) a transaction dealing with regulatory approval of a service.

40. The system of claim 22, wherein at least one of the means for providing an interface and the means for downloading comprises a project participant software program associated with a project participant computer in communication with a server software program associated with a server having access to the storage means.

41. The system of claim 40, wherein the project participant software program comprises a web browser and the server software program comprises a web server software program.

42. The system of claim 41, wherein the web browser and the web server software program communicate via a communications network.

43. The system of claim 42, wherein the communications network is the Internet.

44. The system of claim 22, wherein the means for providing an interface further comprises means for providing one or more interface screens.

* * * * *